United States Patent
Elbe et al.

(10) Patent No.: US 7,426,529 B2
(45) Date of Patent: Sep. 16, 2008

(54) PROCESSOR AND METHOD FOR A SIMULTANEOUS EXECUTION OF A CALCULATION AND A COPYING PROCESS

(75) Inventors: Astrid Elbe, Munich (DE); Wieland Fischer, Munich (DE); Norbert Janssen, Munich (DE); Holger Sedlak, Sauerlach (DE); Jean-Pierre Seifert, Munich (DE)

(73) Assignee: Infineon Technologies AG (DE)

( * ) Notice: Subject to any disclaimer, the term of this patent is extended or adjusted under 35 U.S.C. 154(b) by 833 days.

(21) Appl. No.: 11/006,519

(22) Filed: Dec. 6, 2004

(65) Prior Publication Data

US 2005/0138337 A1 Jun. 23, 2005

Related U.S. Application Data

(63) Continuation of application No. PCT/EP03/05642, filed on May 28, 2003.

(30) Foreign Application Priority Data

Jun. 6, 2002 (DE) .............................. 102 25 230

(51) Int. Cl.
G06F 7/38 (2006.01)
G06F 7/00 (2006.01)
(52) U.S. Cl. ...................... 708/490; 708/492
(58) Field of Classification Search .......... 708/490–492
See application file for complete search history.

(56) References Cited

U.S. PATENT DOCUMENTS

| 3,360,780 | A | 12/1967 | Fabisch | |
|---|---|---|---|---|
| 5,289,397 | A | 2/1994 | Clark et al. | |
| 6,523,053 | B1 * | 2/2003 | Lee et al. ..................... | 708/492 |
| 2002/0010847 | A1 | 1/2002 | Abdallah et al. | |
| 2004/0019622 | A1 * | 1/2004 | Elbe et al. ................... | 708/492 |
| 2004/0210613 | A1 * | 10/2004 | Elbe et al. ................... | 708/492 |
| 2004/0220989 | A1 * | 11/2004 | Elbe et al. ................... | 708/492 |

FOREIGN PATENT DOCUMENTS

DE 36 31 992 A1 11/1987
EP 0 967 544 A3 12/1999

* cited by examiner

*Primary Examiner*—Tan V Mai
(74) *Attorney, Agent, or Firm*—Dickstein, Shapiro, LLP.

(57) ABSTRACT

A processor includes a source register having a source register content, a destination register, a calculating unit for performing a calculation using the source register content, wherein the calculation is performed in several calculation cycles, and wherein in each cycle only one portion of the source register content is useable, a data bus connected to the source register, the destination register and the calculating unit, and a processor controller. The processor controller is operable to supply the source register content in portions to the calculating unit on the one hand and to the destination register on the other hand during the calculation via the data bus, so that after an execution of the calculation the source register content is written into the destination register. Therefore it is possible to obtain a register copy of a source register the destination register via a limited data bus without additional machine cycles for long operands to be processed in portions.

9 Claims, 4 Drawing Sheets

PROCESSOR AND METHOD FOR A SIMULTANEOUS EXECUTION OF A CALCULATION AND A COPYING PROCESS

CROSS-REFERENCE TO RELATED APPLICATIONS

This application is a continuation of co-pending International Application No. PCT/EP03/05642, filed May 28, 2003, which designated the United States and was not published in English, and which is incorporated herein by reference in its entirety.

BACKGROUND OF THE INVENTION

1. Field of the Invention

The present invention relates to processors and in particular to processors having long number calculating units, like they are for example required for cryptographic applications.

2. Description of the Related Art

DE 3631992 C2 discloses a method in which the modular multiplication may be accelerated via Z/NZ using a multiplication look-ahead method and using a reduction look-ahead method. The method described in DE 3631992 C2 is also referred to as the ZDN method and is described in more detail referring to FIG. 6. After an initial step 900 of the algorithm the global variables M, C and N are initialized. It is the object to calculate the following modular multiplication:

$$Z = C*M \bmod N.$$

M is referred to as the multiplier, while C is referred to as the multiplicand. Z is the result of the modular multiplication, while N is the modulus.

In the following, different local variables are initialized, which are not explained in more detail for the time being. In the following, two look-ahead methods are applied. In the multiplication look-ahead method GEN_MULT_LA using different look ahead rules a multiplication shift value $s_z$ and a multiplication look-ahead parameter a are calculated (910). Hereupon, the current content of the Z register is subjected to a left shifting operation by $s_z$ digits (920).

Basically in parallel to this a reduction look-ahead method GEN_Mod_LA (930) is performed to calculate a reduction shift value $s_N$ and a reduction parameter b. In one step 940 the current content of the modulus register, i.e. N, is then shifted by $s_N$ digits to generate a shifted modulus value N'. The central three operand operation of the ZDN method is performed in a step 950. Hereby, the intermediate result Z' is added to the multiplicand C which is multiplied with the multiplication look-ahead parameter a, and to the shifted module N' which is multiplied with the reduction look-ahead parameter b after the step 920. Depending on the current situation, the look-ahead parameters a and b may have a value of +1, 0 or −1.

One case is that the multiplication look-ahead parameter a is +1 and that the reduction look-ahead parameter b is −1, so that the multiplicand C is added to a shifted intermediate result Z', and the shifted modulus N' is subtracted from the same. a will among others have a value equal 0 when the multiplication look-ahead method would allow more than a predetermined number of individual left-shifts, i.e. when $s_z$ is larger than the maximum admissible value of $s_z$, which is also referred to as k. For the case of a being 0 and of Z' still being relatively small due to the preceding modular reduction, i.e. the preceding subtraction of the shifted module, and in particular smaller than the shifted modulus N', no reduction needs to take place, so that the parameter b is equal to 0.

The steps 910 to 950 are performed until any digits of the multiplicand have been operated, i.e. until m is equal to 0, and until also a parameter n is equal to 0, which indicates, whether the shifted modulus N' is still larger than the original modulus N, or if despite of the fact that already any digits of the multiplicand have been operated, further reduction steps have to be performed by subtracting the modulus from Z.

Finally, it is determined, whether Z is smaller than 0. If this is the case, then the modulus N must be added to Z to obtain a final reduction, so that finally the correct result Z of the modular multiplication is obtained. In a step 960 the modular multiplication is terminated using a ZDN method.

The multiplication shift value $s_z$ and the multiplication parameter a which are calculated in step 910 by the multiplication look-ahead algorithm, are obtained by the topology of the multiplier and by the applied look-ahead rules which are described in DE 3631992 C2.

The reduction shift value $s_N$ and the reduction parameter b are determined by a comparison of the current content of the Z register to a value ⅔ times N, as it is also described in DE 3631992 C2. Based on this comparison the ZDN method has the name (ZDN=two thirds N).

The ZDN method, as it is illustrated in FIG. 4, returns the modular multiplication to a three operand addition (block 950 in FIG. 4), wherein for increasing the calculation time efficiency the multiplication look-ahead method and along with it the reduction look-ahead method may be used. Compared to the Montgomery reduction for Z/NZ a calculation time advantage by a factor in the range of 3 may be achieved.

For performing the three operand addition in block 950 of FIG. 4, for example the calculating unit illustrated in FIG. 3a may be used. The calculating unit shown in FIG. 3a includes a first partial calculating unit 30a and a second partial calculating unit 30b. The partial calculating units 30a, 30b consist of bit-slices stapled on top of each other, which are typically all implemented identically. A carry output of the topmost bit-slice of the calculating unit 30a is connected to a least significant bit-slice of the second partial calculating unit 30b via a configuration switch 32, via a carry output line 31. If the configuration switch is closed, i.e. the carry output of the topmost bit-slice of the first partial calculating unit 30a is fed into a carry input of the least significant bit-slice of the second partial calculating unit 30b, the calculating unit arrangement of FIG. 3a functions as a complete calculating unit whose length is equal to the number of bit-slices of the first partial calculating unit 30a plus the number of bit-slices of the second partial calculating unit 30b.

It is to be noted that the arrangement of the two partial calculating units 30a and 30b in FIG. 3a may correspond to the geometrical arrangement of the bit-slices on an integrated circuit. Every bit-slice is set up identically, as it is shown in FIG. 3b. In particular, every bit-slice includes a register location $C_i$ for storing the multiplicand C, a register location for a modulus register for storing the corresponding bits of the modulus N, a register location for storing the corresponding bit i of the intermediate result Z and two auxiliary registers $CR_1$ a $CR_2$, wherein when one bit-slice is considered, each register is "represented" by the bit of the corresponding order i. Finally, each bit-slice also includes an arithmetic unit $AU_i$, comprising a carry input to obtain a carry from the lower stage, and which comprises a carry output to output a carry to the next stage. The carry input is also referred to as carry-in and the carry output is also referred to as carry-out. The line 31 is therefore on the one hand the carry output of the most significant bit of the first partial calculating unit 30a and on the other hand the carry input of the least significant bit-slice of the second partial calculating unit 30b.

By stapling the bit-slices shown in FIG. 3b on top of each other, therefore a long number calculating unit with for example more than 2.048 bit-slices originates, wherein the long number calculating unit comprises the registers C, N, Z, $CR_1$ and $CR_2$ slice-internally, which are respectively more than 2.048 bits long.

Therefore, the long number calculating unit shown in FIG. 3a is able to quickly perform the three operand addition shown in block 950. For a multi-functional processor, which may for example be used as a crypto-coprocessor in a smart card, the desire exists that the same should also be able to perform an RSA calculation or an elliptic curve cryptography calculation for significantly shorter numbers. Thus, an RSA calculation with key lengths of 1.024 bits has a lower security than an RSA calculation with 2.048 bits. In cases, in which the security is, however, satisfactory for 1.024 bits, the calculating unit shown in FIG. 3a should also be applicable efficiently. For this purpose, the configuration switch 32 is provided to interrupt the carry path 31. In this case from the calculating unit of full length two partial calculating units 30a, 30b result, which, however, may agitate independently, for example to perform calculations in parallel which may be parallelized in a cryptographical algorithm. It is thereby achieved that two parallel 1.024 bit calculations may be performed using the calculating unit.

Frequently, an algorithm requires that the contents of the registers C, N, Z, $CR_1$, $CR_2$ are to be copied from one partial calculating unit 30a into the other partial calculating unit 30b or the other way round. For this purpose, an internal bus 33 is provided which provides a connection line to the bit-slice of the corresponding order of the other partial calculating unit for each bit-slice of the first partial calculating unit 30a. Thus, the complete content of a register in the first partial calculating unit 30a may be written into a register of the second partial calculating unit 30b in a quick way. Thus, in one cycle for example a 1.024 bit number in a register of the partial calculating unit 30a may be written into a register of the partial calculating unit 30b. In addition, further a data bus with a width n is provided (34), wherein the width n of the data bus is smaller than the number of bit-slices in a partial calculating unit 30a or 30b and is in particular much smaller and e.g. comprises only 8 bits. The data bus 34 is implemented, however, to be able to access any bit-slices and in particular any registers of the bit-slices of both partial calculating units 30a, 30b via multiplexers 35a, 35b.

The importance of the interior bus 33 on the one hand and of the data bus 34 for a data transfer on the other hand is illustrated using a little number example. It is assumed that each partial calculating unit 30a, 30b comprises 1.024 bit-slices. If register data of a partial calculating network is written via the data bus 34 into a register of the other partial calculating network, then 128 cycles are required for this, which is definitely not acceptable, as a simple load command (load), a store command (store) or a register exchange command (exchange) would require an immense period of time. Therefore, the interior bus 33 is provided, through which the 1.024 bits may be transmitted in one cycle from a calculating unit into the other.

The calculating unit shown in FIG. 3a therefore facilitates that either a calculating unit with full length or two parallel partial calculating units are operable independent of each other, wherein further a faster register exchange between the two partial calculation networks 30a and 30b is possible.

In particular with the elliptic curve cryptography the key lengths are significantly shorter and lie in the range of for example 130 bits. If it is assumed that both the first partial calculation network 30a is to work as an elliptic curve cryptography calculating unit, and the second calculating unit 30b is also to work as an elliptic curve cryptography calculating unit, only for example the topmost 130 bit-slices are required. This active part of the first partial calculating unit 30a is designated by 36a in FIG. 3a, while the active part of the second partial calculating unit 30b is designated with 36b. The remains of the two partial calculating units, i.e. the bit-slices which lie below the bit-slice i or the bit-slice k, respectively, are not required. When it is assumed, for example, that an overall partial calculating unit comprises 1.024 bits and that only the topmost 130 bits are required, then 87% of the register location of each partial calculating unit remains unused. In particular with integrated circuits for chip cards this is especially disadvantageous, as the memory resources on the chip card are anyway very restricted due to tight area limitations.

Thus, it would be conceivable to release the overall remains of the first partial calculating unit 30a as a register, although the arithmetic devices of the bit-slices are not needed, and to release the overall remains of the second partial calculating unit 30b as a register, although also here the arithmetic devices are not required. In this case still a faster register copy of a register of the first partial calculating unit into a register of the second partial calculating unit would be possible via the internal bus connections 33.

On the other hand, cryptographic algorithms which make do with shorter keys, like for example the elliptic curve cryptography (ECC), often have the characteristic that they require a great number of operands.

It would therefore be desirable to divide the non-active area both of the partial calculating unit 30a and also of the second partial calculating unit 30b, respectively, into further units, to define additional registers. These additional registers are realized by the bit-slice substaple designated by 37a, 37b or 38a, 38b, respectively. From FIG. 3a it may be seen that no opportunity for a broad-banded data exchange between the newly defined registers 37a and 38a is possible. Additionally, no broad-banded data exchange between for example the register 38a of the first partial calculating unit 30a and the register 37b of the second partial calculating unit 30b is possible. Such registers may only communicate with each other via the data bus 34, which is in particular disadvantageous in so far that the data bus 34 is narrow-banded. As an example, when for example the register 38a is 130 bits wide and the register 37b is also 130 bits wide, a data exchange from the register 38a to the register 37b via the data bus 34 would require 17 cycles, which is not tolerable due to time reasons. If the registers 38a and 37b are longer than 130 bits, then the number of cycles for a data exchange between these registers via the data bus 34 increases accordingly.

The further division of the non-active areas of the partial calculating units is therefore eliminated due to performance reasons or leads to such a substantial reduction of the performance features of a processor set up this ray if the register division is performed anyway. On the other hand it is not or only hardly acceptable due to the limited memory location limitations to leave a large amount of register memory area unused.

SUMMARY OF THE INVENTION

It is an object of the present invention to provide a concept for a better register usage.

In accordance with a first aspect, the present invention provides a processor, having a source register having a source register content; a destination register; a calculating unit for performing a calculation using the source register content, wherein the calculation is performable in several calculation cycles and wherein in each cycle only one part of the source register content is usable, wherein the calculating unit comprises a calculating unit auxiliary device having an intermediate buffer and a bit-slice staple, wherein the intermediate buffer comprises a smaller memory capacity than the source register or the destination register; a data bus which is connected to the source register, the destination register and the calculating unit; and a processor controller which is operable during the calculation to supply the source register content in portions to the calculating unit on the one hand and to the destination register on the other hand via the data bus, so that after an execution of the several calculation cycles the source register content is brought into the destination register, wherein the processor controller is implemented to fill the intermediate buffer of the calculating unit auxiliary device with a new portion of the source register content when a load control signal is received from the intermediate buffer.

In accordance with a second aspect, the present invention provides a method for a simultaneous execution of a calculation by a calculating unit using a source register content stored in a source register, and a copying process by which the source register content is copied into a destination register, wherein the calculation is performable in several calculation cycles and wherein in each cycle only one part of the source register content is useable, wherein the calculating unit comprises a calculating unit auxiliary device having an intermediate buffer and a bit-slice staple, wherein the intermediate buffer comprises a smaller memory capacity than the source register or the destination register, with the steps, during the calculation in several calculation cycles, supplying the source register content in portions to the calculating unit to perform the several calculation cycles, and writing the portions of the source register content into the destination register in sequence, so that after an execution of the calculation the result of the calculation is obtained and a copy of the source register content in the destination register is obtained, wherein the step of supplying is performed o that the intermediate buffer (15) of the calculating unit auxiliary device is filled with a new portion of the source register content when a load control signal is received from the intermediate buffer.

The present invention is based on the findings that in particular with a modular or a non-modular multiplication and also with other calculations which are performed in several calculation cycles, at least one operand, the multiplier in the example of the multiplication, is not always required in full length in every calculation cycle, but only in portions. Therefore, the operand which is required in portions which is stored in a source register is not required in whole for a calculation but in each calculation cycle only a certain portion of this operand is required and fed to a calculating unit. According to the invention, one portion of the operand which is anyway loaded from the source register and fed to the calculating unit, is additionally already written into a destination register. This is performed in parallel to the calculation cycles, so that after an execution of all calculation cycles for a calculation not only the calculation is performed but a complete copy of the operand loaded in portions is found again in the destination register.

According to the invention, in parallel to a calculation therefore also a copy from the source register into the destination register is performed in portions in several calculation cycles. The copy command is therefore time-parallel to the calculation command. Through this parallel execution for the copy command itself no additional machine cycle is required. The copy command therefore does not require additional time, which exceeds the time for the execution of the cyclic calculation which is required anyway.

One advantage of the present invention is, apart from the fact, that the copy command itself does not require time, that the process of copying after the calculation, like for example a multiplication, may be hidden and can therefore not be found out by power profile analysis, etc. Thereby, by the parallel running of the calculation and the copying, an increased safety standard is achieved.

One further advantage of the present invention is, that such operands which may be processed in portion, like e.g. the multiplier in a multiplication, may be copied into any destination registers connected to the data bus without an additional time effort and also via the data bus, which typically does not have a high great width, and is for example only 8 bit wide, independent of the fact how long the destination register is or how many machine cycles would be required for a separate copy, respectively.

In particular in the elliptic curve cryptography in which many multiplications with many multipliers are to be performed, also calculating unit registers which do not have a broad-banded data connection to other calculating unit registers may be used for storing long operands, so that an optimum register utilization without a performance loss is achieved for these operands to be processed in portions, like e.g. multipliers. If only calculating unit registers are additionally required for such operands to be processed in portions, then also a possibly present broad-banded data connection between some of such registers may be switched off to minimize the current consumption of the calculating unit. Despite switching off the broad-banded data connection, through the inventive simultaneous calculating and copying via the narrow-banded data bus an optimum register utilization may be achieved. The provision of additional registers for the elliptic curve cryptography is therefore omitted, which again has the advantage that in particular long number calculating units are optimally useable for different applications with strongly varying key lengths and are adjustable for the corresponding task.

BRIEF DESCRIPTION OF THE DRAWINGS

In the following, preferred embodiments of the present invention are explained in more detail with reference to the accompanying drawings, in which.

DESCRIPTION OF THE PREFERRED EMBODIMENTS

Figure 1:
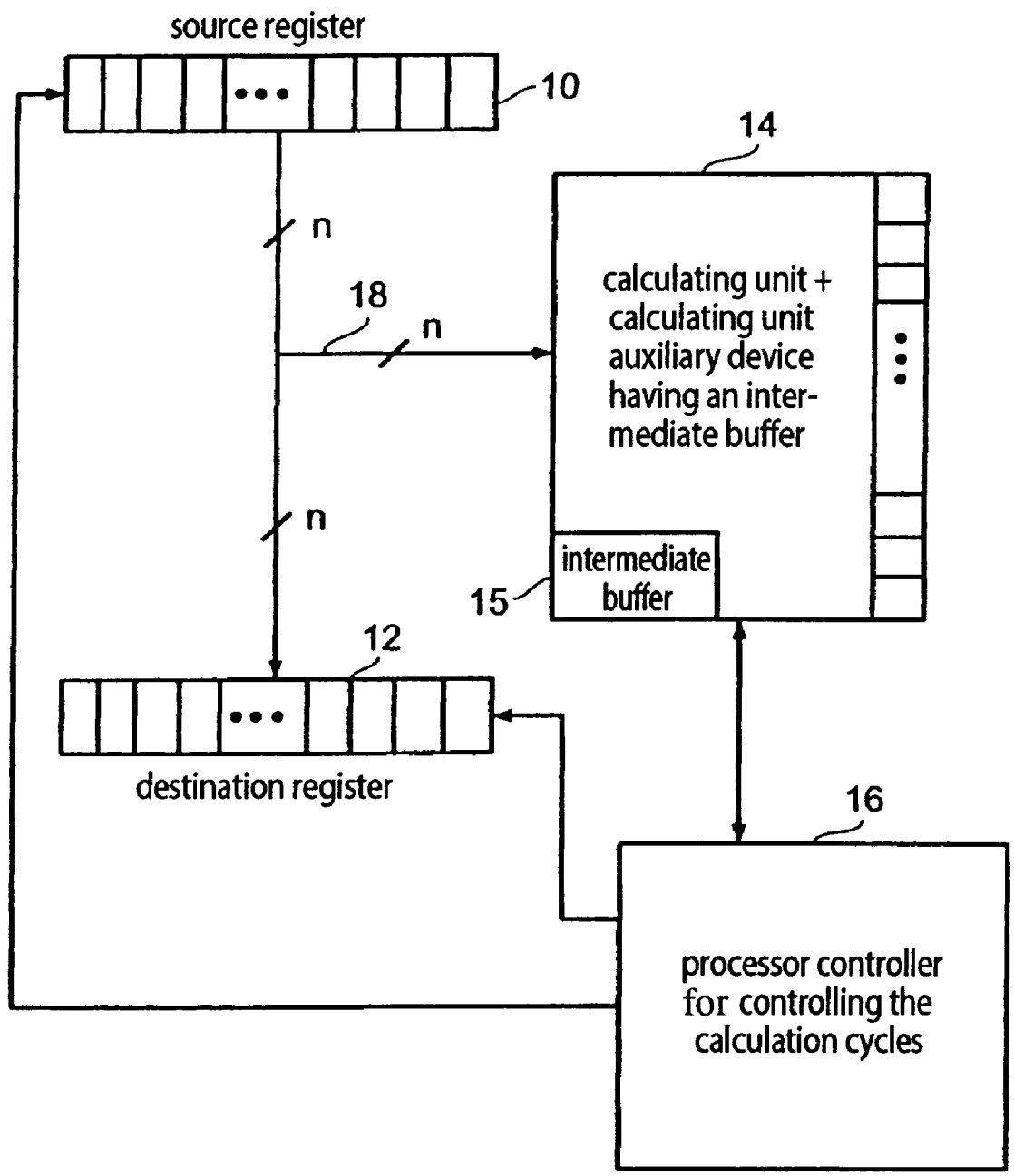
FIG. 1 shows a block diagram of an inventive processor.

FIG. 1 shows an inventive processor having a source register 10, a destination register 12, a calculating unit 14, a processor controller 16 and a data bus 18 having a data width of n bits. The data width n of the data bus 18 is typically substantially smaller than the length of the source register 10 or the destination register 12 or the number of bit-slices of the calculating unit 14 and is therefore, e.g. between 8 and 32 bits.

The data bus 18 is connected both to the source register 10 and to the calculating unit 14 and also to the destination register 12.

The calculating unit 14 is implemented to perform a calculation using the source register content, wherein the calculation may be performed in several calculation cycles and wherein in each cycle only one portion of the source register content, i.e. only one portion of a variable size of the operand stored in the source register 10 is usable.

Figure 4:
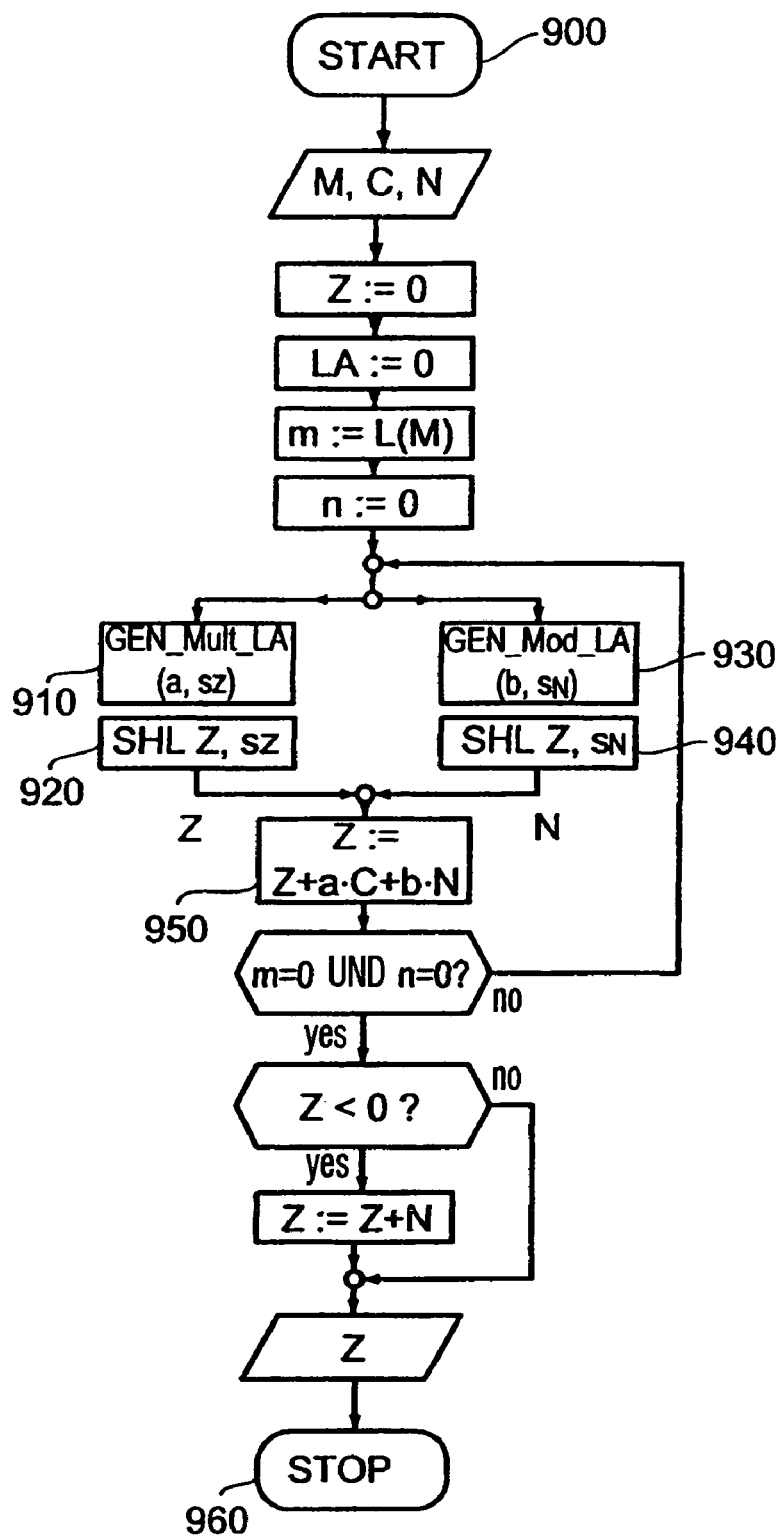
FIG. 4 shows a flowchart of a known ZDN method for a modular multiplication with a simultaneous use of a multiplication look-ahead method and a reduction look-ahead method.

The processor controller 16 is operable to feed one part of the source register content which is required for this calculation cycle to the calculating unit 14 on the one hand and—according to the present invention—to the destination register 12 on the other hand via the data bus 18 before a calculation cycle, so that after the execution of the several calculation cycles the calculating unit 14 includes the result of the calculation on the one hand, and that on the other hand in the destination register 12 a complete copy of the source register 10 is present. In this example of the multiplication using a multiplication look-ahead method, in a first calculation cycle, e.g. the topmost 8 bits of the source register 10 in which the multiplier is present are fed to a calculating unit 14 and in particular to a calculating unit auxiliary device having a buffer which is between 20 and 30 bits large, i.e. a small buffer. The calculating unit auxiliary device examines this part of the multiplier, i.e. the portion of the supplied bits, to generate shifting values for the intermediate result on the one hand and a multiplication look-ahead parameter for the portion of the bits on the other hand. Using the calculated shift value and the calculated multiplication look-ahead parameter, which have been determined by the calculating unit auxiliary device, a calculation cycle is then performed which is typically to be performed in a two operand addition in the example of a normal multiplication or a three operand addition in the example of a modular multiplication, e.g. according to the calculation instruction shown in block 950 of FIG. 4.

As it is not known from the beginning in multiplication look-ahead methods how many bits of the multiplier may be processed simultaneously, the calculating unit auxiliary device includes a buffer register which is, e.g. 16 or 24 bits large as it has been implemented, which is first of all, before the start of the calculation, loaded with the multiplier bits in portions. According to the invention, during this loading in portions of the buffer register of the calculating unit auxiliary device simultaneously also the destination register is gradually described. If, for example, the first 8 bits of the source register are written into the buffer register of the calculating unit auxiliary device, then these 8 bits are also written in the top 8 register memory locations of the destination register. When the next 8 bits of the source register are then written into the buffer register of the calculating unit auxiliary device, then these second 8 bits are also written to the corresponding second 8 memory locations of the destination register. Sometime, the calculating unit 14 will start to process the multiplication in cycles when a full buffer level of the auxiliary buffer of the calculating unit auxiliary device is signalized. As soon as a critical buffer level is signalized in the intermediate buffer of the calculating unit auxiliary device, a next portion of bits of the source register is loaded into this buffer. Simultaneously, this portion of the bits of the source register is then also loaded into the destination register according to the present invention.

From the above discussion it may be seen that the destination register loading will not necessarily be executed completely synchronously to the calculation cycles, but primarily synchronously to the loading of the intermediate buffer of the calculating unit auxiliary device. If a calculating unit auxiliary device does not have such an intermediate buffer, i.e. if for example always in every calculation cycle the same number of bits of the source register content are required in a calculation, then the copy process from the source register to the destination register may also be executed synchronously to the calculation cycles.

In any case, after an execution of the calculation after several calculation cycles the complete content of the source register 10 must be copied into the destination register 12 via the data bus which is only n bits wide.

Figure 2:
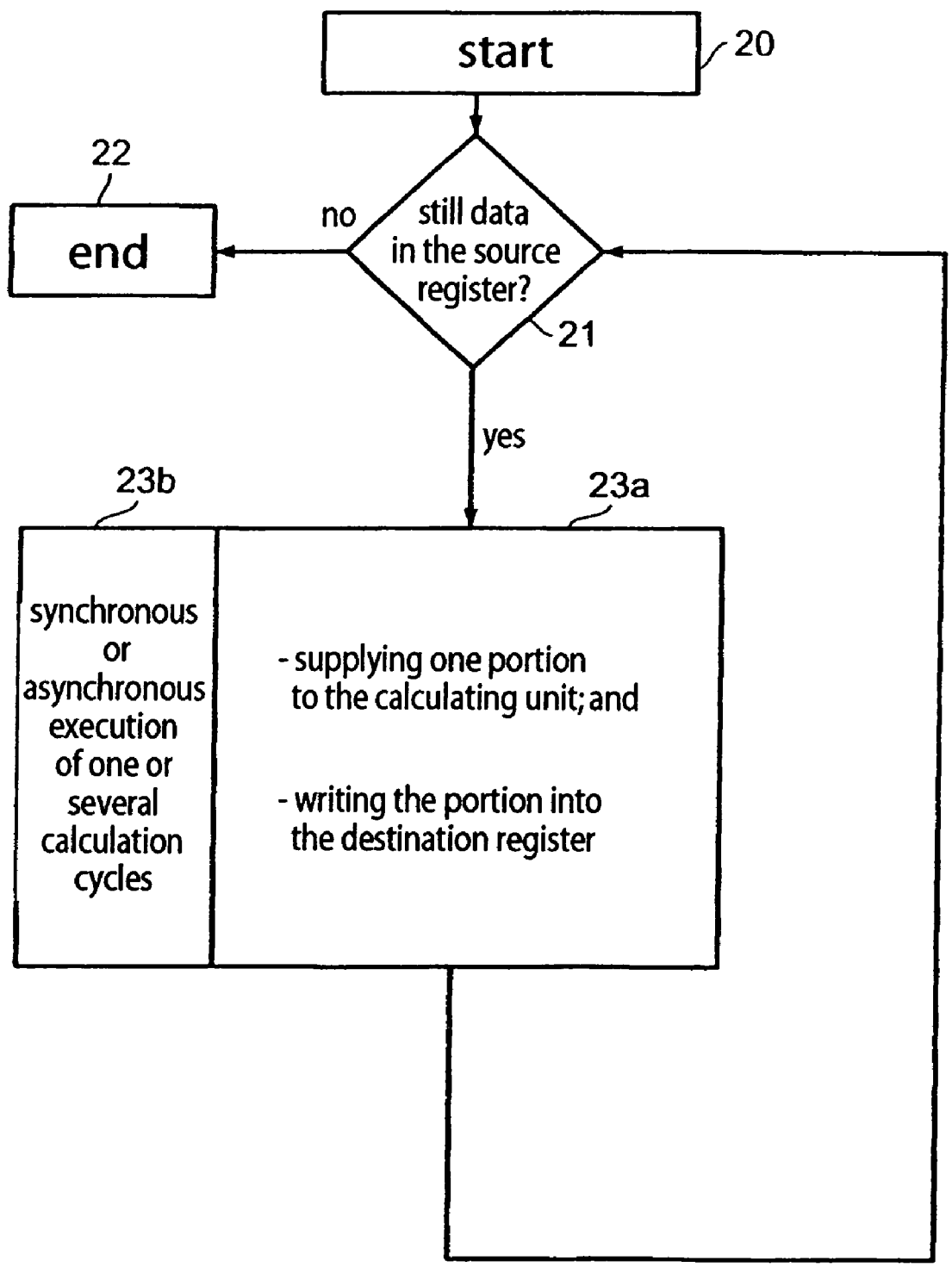
FIG. 2 shows a flowchart of the inventive method.

In the following, a flowchart of the inventive method for a simultaneous execution of a calculation and for performing a copying process is illustrated with reference to FIG. 2. The concept starts in a block 20. In a decision block 21 it is determined whether there is still data present in the source register which needs to be supplied to the calculating unit 14. If this question is answered by "no", then the method is ended (22). If this question is, however, answered by "yes", then first of all one portion of the source register content is supplied to the calculating unit (14 in FIG. 1) in a block 23a. Simultaneously, the portion is also written into the destination register (12 in FIG. 1). In parallel to this, one or several calculation cycles are performed (block 23b) by the calculating unit. The performance in block 23b is either performed synchronously to the feeding of the portions to the calculating unit or asynchronously to the same. In the embodiment illustrated in FIG. 1, in which an intermediate buffer (15 in FIG. 1) is present in the calculating unit and in particular in the auxiliary device of the calculating unit, a calculation is performed in several calculation cycles in parallel to the feeding and loading into the destination register in portions, however, asynchronously to the same.

The decoupling between the supplied bits on the one hand, which are typically supplied as fixed portions, and the actually "consumed" bits of a multiplier by the calculating unit 14 in a calculation cycle which are not fixed per calculation cycle but which are dependent on the type of the multiplier bits, as it is known for look-ahead algorithms, is provided by the buffer of the calculating unit auxiliary device. When the multiplier bits for the look-ahead method are favorable, then in fact 8 multiplier bits may be processed in a calculation cycle, i.e. one portion which is loaded from the source register. If the multiplier bits, however, are unfavorable for the look-ahead method, then the case may well occur, that only one or two multiplier bits are processed or "consumed" in one calculation cycle. In this case, the portions of the source register content are fed into the intermediate buffer 15 of FIG. 1, which decouples the loading in portions of the multiplier bits into the calculating unit, which is performed in fixed portions, from the "consuming" of the bits in the individual calculation cycles. Anyway, the loading in portions of the source register content is performed in consecutive steps in parallel to the performance of the calculation in consecutive calculation cycles, wherein the calculation cycles and the loading in portions may well be synchronous in certain cases, which will in the case of the multiplication however be asynchronous due to the inherent asynchrony of multiplication look-ahead algorithms.

Figure 3A:
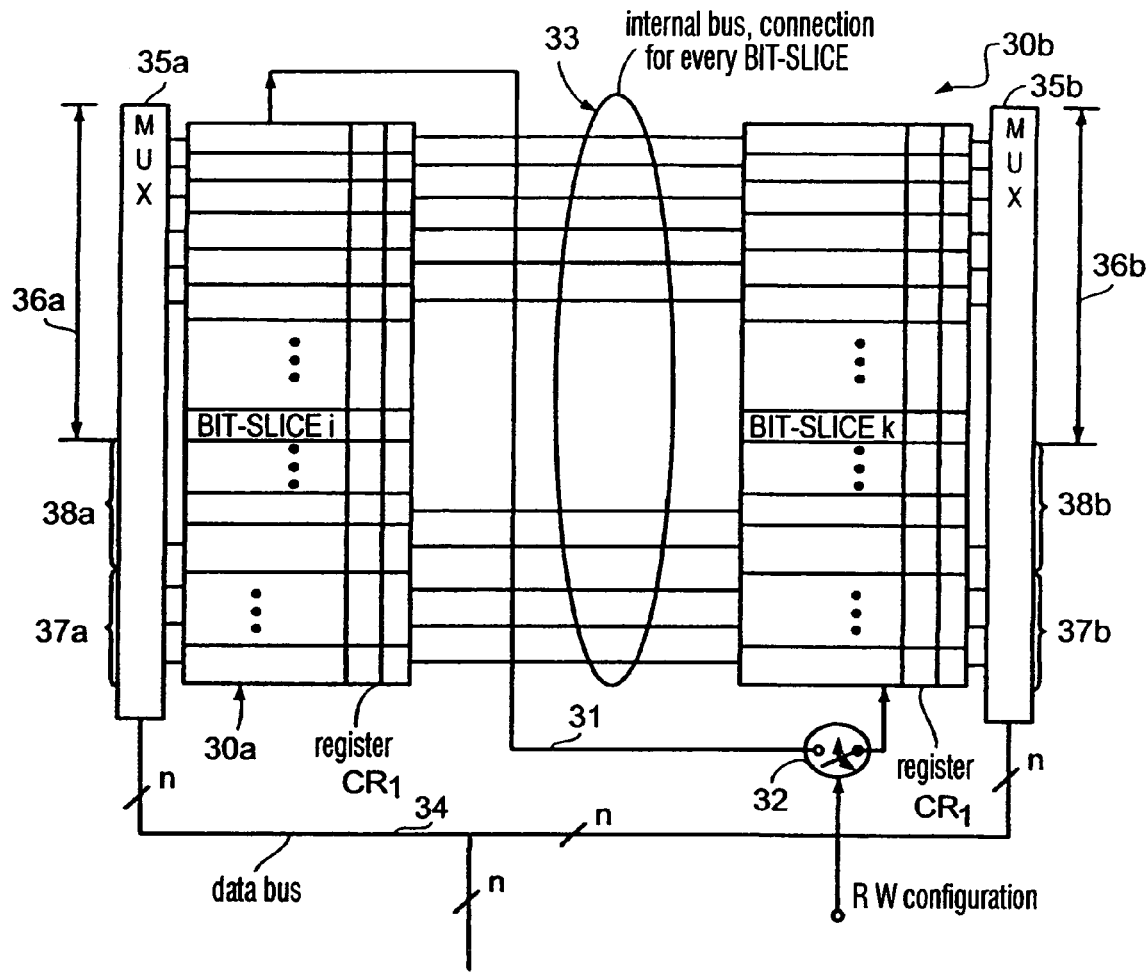
FIG. 3*a* shows a configurable long number calculating unit in which the inventive concept is applicable.
Figure 3B:
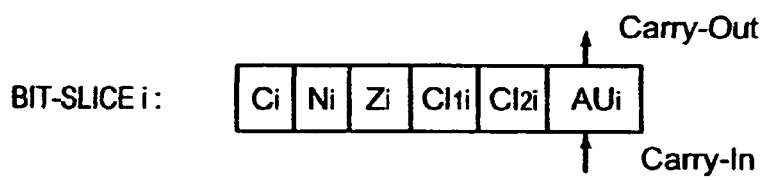
FIG. 3*b* shows a detailed illustration of a bit-slice.

The source register may in the case of a multiplication also be arranged exterior to the calculating unit 14. This is, however, not strictly necessary. The source register may of course also be one of the registers 38a, 37a, 38b, 37b in FIG. 3b. The same applies to the destination register. Also the destination register need not necessarily be within the calculating unit, wherein this is, however, mostly the case in the case of a configurable calculating unit. It is necessary in any case that the source register and the destination register are connected to each other via the data bus 34.

In particular for the execution of a multiplication of two operands the multiplier is read in portions according to the bit width of the data bus 34 and written into the calculating unit auxiliary device which is also referred to as a controller via the data bus, where this portion is evaluated by the multiplication algorithm. According to the invention, the value which is already present on the data bus 34 (FIG. 3a) or 18 (FIG. 1), respectively, is written simultaneously into any other available register. In parallel to the multiplication the multiplier to be scanned is also copied into another register. By this, long registers for operands processed in portions are provided and will be completely useable despite the fact that they may only be accessed via a bus with a small bandwidth, wherein the copying process is performed without an additional time loss. An additional effort need only to be spent for the processor control 16 of FIG. 1 to manipulate the destination register 12 such that it stores the source register content portions applied to the data bus 18 of FIG. 1 at corresponding register locations.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A processor, comprising:
    a source register having a source register content;
    a destination register;
    a calculating unit for performing a calculation using the source register content, wherein the calculation is performable in several calculation cycles, and in each cycle only one portion of the source register content is usable, and wherein the calculating unit comprises a calculating unit auxiliary device having an intermediate buffer and a bit-slice staple, the intermediate buffer comprising a smaller memory capacity than the source register or the destination register;
    a data bus which is connected to the source register, the destination register, and the calculating unit; and
    a processor controller which is operable during the calculation to supply the source register content in portions to the calculating unit on the one hand and to the destination register on the other hand via the data bus, so that after performance of the several calculation cycles the source register content is supplied to the destination register, wherein the processor controller is implemented to fill the intermediate buffer of the calculating unit auxiliary device with a new portion of the source register content when a load control signal is received from the intermediate buffer.

2. The processor according to claim 1, wherein the source register and the destination register have a register length which is larger than a data width of the data bus.

3. The processor according to claim 1,
    wherein the calculating unit comprises a number of bit-slices which is larger than 64 bits.

4. The processor according to claim 1,
    wherein a bit-slice of the bit-slice staple comprises an arithmetic unit and a bit from one or several internal calculating unit registers, wherein a register for an intermediate result may be updated in each calculation cycle.

5. The processor according to claim 4,
    wherein the calculating unit is configurable to use only one portion of the number of bit-slices for performing the calculation, and
    wherein the bits of the one or the several internal calculating unit registers in the bit slices which are-not used for the performance of the calculation from the source register which may be accessed through the data bus.

6. The processor according to claim 1,
    wherein the calculation includes a multiplication of a multiplicand and a multiplier,
    wherein the multiplier is stored in the source register which is accessed through the data bus,
    wherein the multiplicand is stored in a multiplicand register implemented in the calculating unit, and
    wherein in every calculation cycle a number of bits of the multiplier are processed by the calculating unit and wherein in parallel to the processing of the multiplier bits portions of multiplier bits are supplied to the calculating unit.

7. The processor according to claim 6,
    wherein the intermediate result register in each calculation cycle may be updated using the bits of the multiplier supplied to the calculating unit.

8. The processor according to claim 6,
    wherein the multiplication is a modular multiplication with reference to a modulus, wherein for the modulus a modulus register implemented in the calculating unit is provided.

9. A method for a simultaneous execution of a calculation by a calculating unit using a source register content stored in a source register, and a copying process by which the source register content is copied into a destination register, wherein the calculation is performable in several calculation cycles, and in each cycle only one portion of the source register content is useable, wherein the calculating unit comprises a calculating unit auxiliary device having an intermediate buffer and a bit-slice staple, the intermediate buffer comprising a smaller memory capacity than the source register or the destination register, the method comprising the steps of:
    during the calculation in several calculation cycles, supplying the source register content in portions to the calculating unit to perform the several calculation cycles;
    writing the portions of the source register content into the destination register in sequence, so that after performance of the calculation the result of the calculation is obtained and a copy of the source register content in the destination register are obtained; and
    wherein the step of supplying comprises the step of filling the intermediate buffer of the calculating unit auxiliary device with a new portion of the source register content when a load control signal is received from the intermediate buffer.

* * * * *